US006996649B2

(12) United States Patent
Necker et al.

(10) Patent No.: US 6,996,649 B2
(45) Date of Patent: Feb. 7, 2006

(54) DECOUPLING UNIT FOR BUS SYSTEMS THAT BLOCKS ABNORMAL DOMINANT SIGNALS FROM PASSING BETWEEN CONNECTED BUS SYSTEMS

(75) Inventors: Karl-Heinz Necker, Königsfeld (DE);
Peter Güttler, Constance (DE);
Eberhard Oser, Rielasingen (DE);
Stephan Dohrmann, Constance (DE)

(73) Assignee: TRW Automotive Electronics & Components GmbH & Co.KG, Radolfzell (DE)

( * ) Notice: Subject to any disclaimer, the term of this patent is extended or adjusted under 35 U.S.C. 154(b) by 280 days.

(21) Appl. No.: 09/735,448

(22) Filed: Dec. 13, 2000

(65) Prior Publication Data

US 2001/0004751 A1    Jun. 21, 2001

(30) Foreign Application Priority Data

Dec. 16, 1999    (DE) .............................. 199 60 859

(51) Int. Cl.
*G06F 13/14*    (2006.01)

(52) U.S. Cl. ..................................... 710/305; 710/100
(58) Field of Classification Search ................ 710/305, 710/128, 260–266, 100, 306; 713/300
See application file for complete search history.

(56) References Cited

U.S. PATENT DOCUMENTS

| 5,809,077 A | * | 9/1998 | Dorner et al. ............... 375/257 |
| 5,999,389 A | | 12/1999 | Luebke et al. |
| 2002/0065967 A1 | * | 5/2002 | MacWilliams et al. ..... 710/105 |

FOREIGN PATENT DOCUMENTS

| DE | 19603221 | 1/1997 |
| DE | 19625401 | 9/1997 |
| DE | 19833462 | 1/2000 |
| DE | 19843448 | 3/2000 |
| EP | 1052760 | 11/2000 |

OTHER PUBLICATIONS

Article entitled Data Sheet: "TJA1054, Fault-tolerant CAN Receiver", Feb. 11, 1999.

* cited by examiner

*Primary Examiner*—Rehana Perveen
*Assistant Examiner*—Kim T. Huynh
(74) *Attorney, Agent, or Firm*—Tarolli, Sundheim, Covell & Tummino L.L.P.

(57) ABSTRACT

A decoupling unit for two bus systems connected with each other includes a connecting circuit between two interface circuits. The first interface circuit has ports for one of the two bus systems and a bidirectional data port for the connecting circuit. The second interface circuit has ports for the other bus system and a bidirectional data port for the connecting circuit. The connecting circuit includes a filter for blocking abnormal dominant signals and passing normal signals between the bus systems.

13 Claims, 2 Drawing Sheets

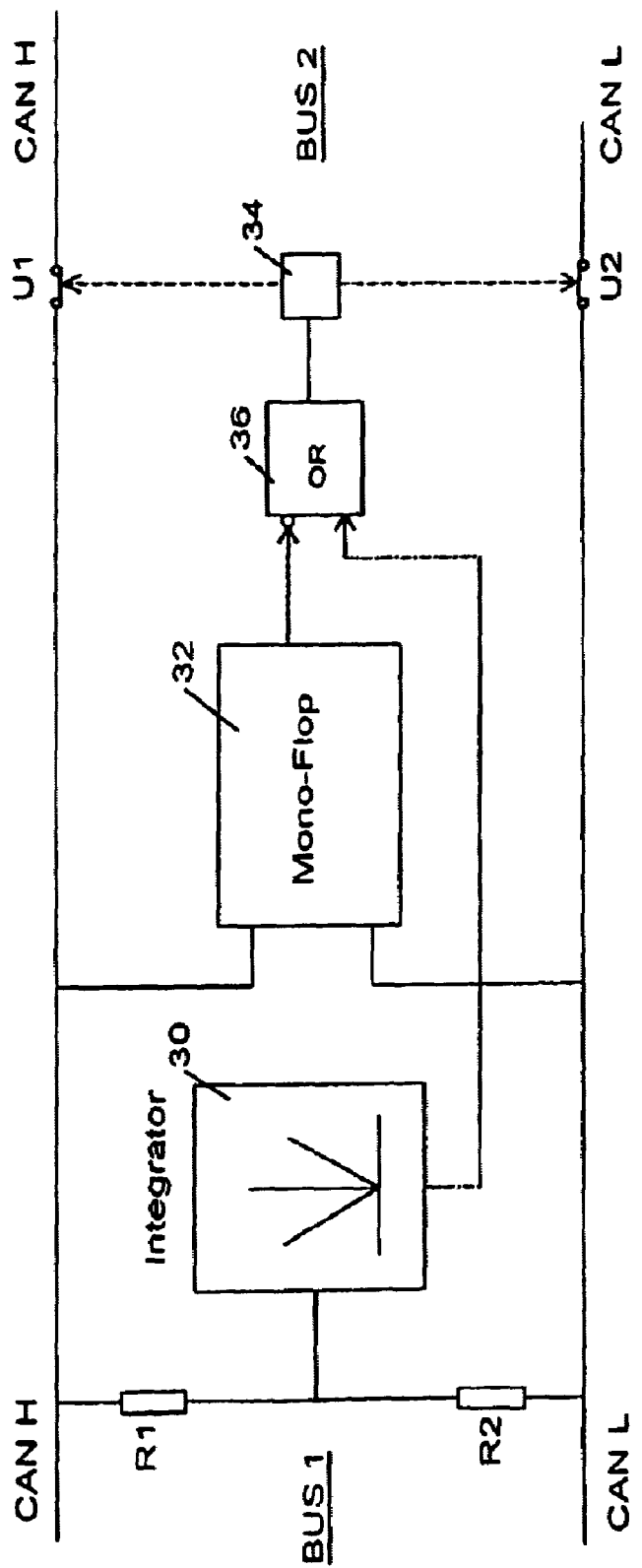

DECOUPLING UNIT FOR BUS SYSTEMS THAT BLOCKS ABNORMAL DOMINANT SIGNALS FROM PASSING BETWEEN CONNECTED BUS SYSTEMS

This invention relates to a coupling unit for two bus systems connected with each other.

When two similar or different bus systems are connected with each other, malfunctions occurring in one of the bus systems may lead to corresponding malfunctions in the other bus system. When one bus system enforces a signal condition on the other bus system, this is called a dominant signal. When one bus system is disturbed by a permanent dominant signal, the other bus system connected therewith will also break down.

The invention particularly relates to bus systems in vehicles. The bus systems increasingly installed in vehicles can be divided according to different functions which have different priorities. A distinction is made for instance between peripheral bus systems allocated to the external vehicle areas and internal bus systems for control and safety functions. Since different bus systems communicate with each other, there is a risk that one bus system will be impaired in the case of malfunctions of other bus systems. In the vehicle, peripheral bus systems are susceptible of being affected by an accident. A vehicle impact may for instance lead to a short-circuit in a peripheral bus system. The dominant signal then permanently generated by the bus system can disturb or even put out of operation the internal bus system.

The invention provides a decoupling unit for two bus systems connected with each other, which prevents a disturbed bus system from impairing the function of the other bus system.

In accordance with a first embodiment of the invention, the decoupling unit includes two interface circuits and between the same a connecting circuit. The first interface circuit has a bidirectional bus port for one bus system and a bidirectional data port for the connecting circuit. The second interface circuit has a bidirectional bus port for the other bus system and a bidirectional data port for the connecting circuit. The connecting circuit includes a filter for blocking abnormal dominant signals and passing normal signals between the two bus systems. Since the decoupling unit blocks abnormal dominant signals from one bus system, the same cannot impair the function of the other bus system.

The interface circuits convert the signals received on the bus side into corresponding logic levels, which are processed by the connecting circuit. The logic levels supplied by the connecting circuit to the interface circuits are converted by the same into corresponding bus signals.

The decoupling unit in accordance with the invention may be composed of simple discrete electronic components. This results in low costs involved and yet provides a safe function. As compared to a microprocessor solution there is in addition the advantage of avoiding interference from radiation.

According to a second embodiment of the invention, the decoupling unit comprises a DC voltage detector which provides a control signal when a DC voltage is detected between the wires of the same bus system. There is further provided a signal failure detector which provides a control signal in case no pulse signals occur on one of the bus systems. Finally, the decoupling unit comprises a driving circuit that activates a switch in response to the control signals of the two detectors, the switch electrically disconnecting the bus systems.

The advantage of the second embodiment lies in the fact that a signal delay of the signals between the two bus systems which occurs in the first embodiment is eliminated.

Advantageous embodiments of the invention can be taken from the following description of an embodiment of the decoupling unit and from the drawings to which reference is made and in which:

FIG. 2 is a block circuit diagram of an alternative embodiment of the decoupling unit.

Figure 1:
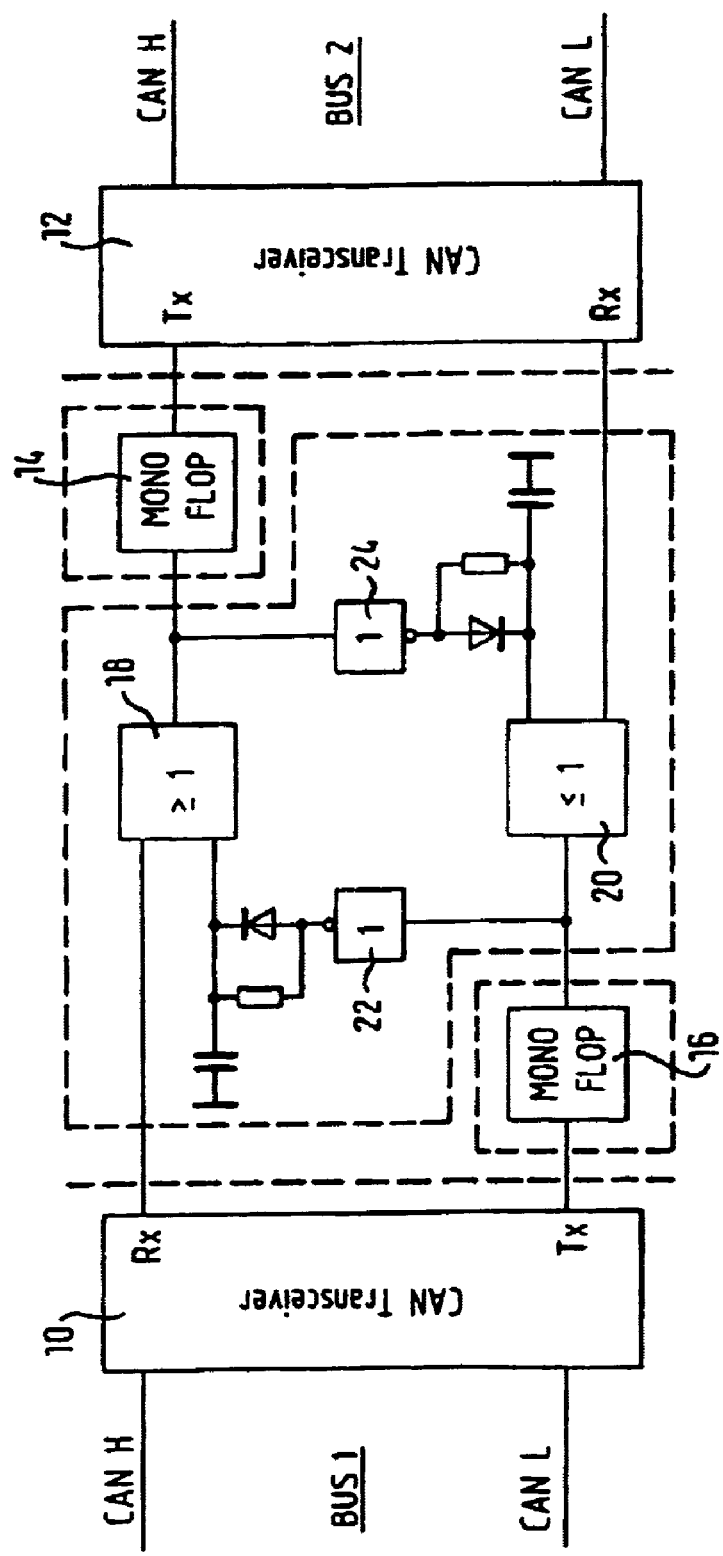
FIG. 1 is a block circuit diagram of the coupling unit.

In the described embodiment according to FIG. 1 it is assumed that two CAN-type two-wire bus systems are connected with each other by a decoupling unit. The bus systems are designated in the drawing with Bus 1 and Bus 2. Each of the two bus systems is connected to an interface circuit 10, 12. These interface circuits are commercially available transmitter/receiver circuits, in particular CAN Transceivers. Between the interface circuits 10, 12 a connecting circuit is provided. This connecting circuit is symmetrical between the interface circuits 10, 12, so that it has the same functionality in each direction of the signal flow. The transmission of signals between the interface circuits 10, 12 is each effected from a port Rx to a port Tx. In each signal path between a port Rx and a port Tx there is disposed a filter means which blocks abnormal dominant signals, but passes normal signals. In the preferred embodiment, these filters include monoflops 14, 16. When the signal level arriving at such filter remains unchanged, which corresponds to a dominant signal, the output of the filter jumps to the opposite signal level at the end of the time element of the monoflop, which then corresponds to a recessive signal, which does not impair the function of the connected bus system. Pulse signals, however, are permitted to pass through the monoflops.

Since in the interface circuits 10, 12 the ports Rx and Tx are coupled internally, the connecting circuit additionally includes means for feedback elimination. In each signal path between a port Rx and a port Tx there is an OR gate 18, 20 with two inputs. To a first input of each OR gate 18, 20 a respective port Rx of the interface circuits 10, 12 is connected. To a second input of each OR gate 18, 20 an output signal of the respective other OR gate, as inverted by an inverter 22, 24, is applied. An RC combination with a diode each ensures a slight prolongation of the signal pulse applied to the corresponding input of the OR gates 18 and 20. By means of this simple feed back elimination each signal output by one of the OR gates 18, 20 is blocked by the other OR gate.

In the embodiment shown in FIG. 2 there is provided between the first bus system and the second bus system a two-pole switch U1, U2 which in the non-activated state connects the two bus systems and, when activated, electrically disconnects the bus systems. The first bus system includes a DC voltage detector 30, the input signal of which is derived by a voltage divider composed of two resistors R1, R2 in tandem arrangement and is connected across the two wires of the first bus system. The DC voltage detector 30 comprises an integrator which upon occurring of a predetermined potential level, i.e. with a DC voltage signal being present at the input of the DC voltage detector 30 for a predetermined period of time, outputs a driving signal to an OR gate 36 which for its part addresses a driving circuit 34, for activating the switch U1, U2 and electrically disconnecting the bus systems.

Connected in parallel to the voltage divider is a signal failure detector 32 which has a retriggerable monoflop. A pulse signal is present at the input of the signal failure detector 32, this signal with the bus being intact permanently keeping the retriggerable monoflop of the signal failure detector in the metastable state. If the pulses fail to appear (bus disturbed), the monoflop switches at the end of its time elements to the opposite switching condition and remains in this condition. The corresponding output signal of the signal failure detector 32 is applied to an inverting input of the OR gate 36, so that in that case, too, the two bus systems are electrically disconnected. Since in the case of a short-circuit no pulse signals are applied to the input of the signal failure detector, a short-circuit in the first bus system is able to be detected and the two bus systems may be disconnected for preventing the second bus system from being impaired.

The advantage of the second embodiment lies in the fact that the signal delay of the signals between the two bus systems which occurs in the embodiment according to FIG. 1 is eliminated, this delay resulting from the time element of the monoflops 14, 16.

In the circuit as shown in FIG. 2, only bus 2 is protected from being impaired by a possible malfunction in bus 1. In order to achieve that each bus is protected against being impaired by the respective other one, the circuit shown in FIG. 2 is also provided on the side of bus 2, i.e. in mirror arrangement with respect to driving circuit 34. In so doing, the two circuits may act on the one driving circuit 34 shown or there is provided for each unit a separate driving circuit including switches.

What is claimed is:

1. A decoupling unit for two bus systems connected with each other, comprising:
    a connecting circuit;
    a first interface circuit including a bidirectional bus port for one of said bus systems and a bidirectional data port for said connecting circuit;
    a second interface circuit including a bidirectional bus port for the other of said bus systems and a bidirectional data port for said connecting circuit;
    the connecting circuit comprising filter means for blocking abnormal dominant signals and passing normal signals between said bus systems, wherein abnormal dominant signals of a bus system indicate a failure therein and occur during a period incompatible with a bus protocol of said bus system.

2. The decoupling unit as claimed in claim 1, wherein interface circuits convert bus signals into logic levels and logic levels into bus signals.

3. The decoupling unit as claimed in claim 2, wherein said filter means contain a monoflop.

4. The decoupling unit as claimed in claim 1, wherein said connecting circuit comprises gate means which, at least for a period of passage of a signal from a transmitting bus system to a receiving bus system, eliminates any feedback of said signal to said transmitting bus system.

5. The decoupling unit as claimed in claim 4, wherein said gate means has an OR gate with a first input to which a signal from a data port of one interface circuit is applied, and a second input to which an inverted signal from a data port of said other interface circuit is applied.

6. The decoupling unit as claimed in claim 5, wherein said inverted signal is delayed at said second input of said OR gate by an RC combination.

7. The decoupling unit as claimed in claim 1, wherein said connecting circuit is symmetrical between said interface circuits.

8. The decoupling unit as claimed in claim 1, characterized by being used in a motor vehicle, where the integrity of one bus system is susceptible of being affected by an accident and said other bus system is allocated to functions of a higher priority.

9. The decoupling unit as claimed in claim 8, wherein an internal CAN bus is connected with a peripheral CAN bus.

10. A decoupling unit for two interconnected two-wire bus systems, comprising:
    a switch that, when activated, electrically disconnects said bus systems;
    a DC voltage detector providing a control signal when a DC voltage is detected between said wires of the same bus system;
    a signal failure detector providing a control signal in case no signals occur on one of said bus systems which indicates a disturbance of said one bus system; and
    a driving circuit that activates said switch in response to said control signals.

11. The decoupling unit as claimed in claim 10, wherein said DC voltage detector comprises an integrator and an input signal of said integrator is derived by a voltage divider connected across said two wires of one of said bus systems.

12. A decoupling unit for two interconnected two-wire bus systems, comprising:
    a switch that, when activated, electrically disconnects said bus systems;
    a DC voltage detector providing a control signal when a DC voltage is detected between said wires of the same bus system;
    a signal failure detector providing a control signal in case no signals occur on one of said bus systems which indicates a disturbance of said one bus system; and
    a driving circuit that activates said switch in response to said control signals,
    wherein said signal failure detector comprises a retriggerable monoflop, the input signal of which is taken between said two wires of the one bus system.

13. A decoupling unit for two interconnected two-wire bus systems, comprising:
    a switch that, when activated, electrically disconnects said bus systems;
    a DC voltage detector providing a control signal when a DC voltage is detected between said wires of the same bus system;
    a signal failure detector providing a control signal in case no signals occur on one of said bus systems which indicates a disturbance of said one bus system; and
    a driving circuit that activates said switch in response to said control signals,
    wherein said control signals of said DC voltage detector and said signal failure detector are applied to a pair of inputs of an OR gate an output of which is connected to an input of said driver circuit.

* * * * *